United States Patent
Yamanaka et al.

(10) Patent No.: US 7,479,089 B2
(45) Date of Patent: Jan. 20, 2009

(54) DIFFERENTIAL GEAR APPARATUS

(75) Inventors: Kosuke Yamanaka, Kashiwara (JP); Shiro Nakano, Minamikawachi-gun (JP); Kenji Higashi, Yamatokoriyama (JP); Atsushi Ishihara, Yamatokoriyama (JP); Daisuke Maeda, Kashiwara (JP)

(73) Assignee: JTEKT Corporation, Osaka (JP)

( * ) Notice: Subject to any disclaimer, the term of this patent is extended or adjusted under 35 U.S.C. 154(b) by 424 days.

(21) Appl. No.: 11/339,760

(22) Filed: Jan. 24, 2006

(65) Prior Publication Data

US 2006/0166771 A1    Jul. 27, 2006

(30) Foreign Application Priority Data

Jan. 26, 2005 (JP) .................. 2005-018174
Mar. 8, 2005 (JP) .................. 2005-064533

(51) Int. Cl.
F16H 57/08 (2006.01)

(52) U.S. Cl. ........................ 475/344
(58) Field of Classification Search .......... 475/344
See application file for complete search history.

(56) References Cited

U.S. PATENT DOCUMENTS

| 3,021,731 | A | * | 2/1962 | Stoeckicht | 475/344 |
| 3,241,392 | A | * | 3/1966 | Hardy | 74/462 |
| 4,292,857 | A | * | 10/1981 | Matusz | 74/466 |
| 4,294,132 | A | * | 10/1981 | Matusz | 74/462 |
| 4,759,235 | A | * | 7/1988 | Hiramitsu et al. | 475/339 |
| 4,802,546 | A | * | 2/1989 | Sakikawa et al. | 180/440 |
| 7,264,129 | B2 | * | 9/2007 | Rilbe et al. | 212/247 |
| 2005/0288142 | A1 | * | 12/2005 | Yamanaka et al. | 475/4 |
| 2006/0117886 | A1 | * | 6/2006 | Ohno et al. | 74/423 |
| 2006/0135312 | A1 | * | 6/2006 | Shiina et al. | 475/339 |
| 2007/0042860 | A1 | * | 2/2007 | Rihn et al. | 475/344 |

FOREIGN PATENT DOCUMENTS

| JP | 61-122071 A | 6/1986 |
| JP | 61-122072 A | 6/1986 |
| JP | 61-122073 A | 6/1986 |
| JP | 61-122074 A | 6/1986 |
| JP | 61-122075 A | 6/1986 |
| JP | 61-122076 A | 6/1986 |
| JP | 61-122077 A | 6/1986 |
| JP | 09-207792 A | 8/1997 |
| JP | 2001-199356 A | 7/2001 |
| JP | 2003-165452 A | 6/2003 |
| JP | 2003-312486 A | 11/2003 |

* cited by examiner

*Primary Examiner*—Sherry Estremsky
(74) *Attorney, Agent, or Firm*—Darby & Darby P.C.

(57) ABSTRACT

A differential gear apparatus according to the present invention comprises a first sun gear coupled to a first shaft to be rotated in conjunction with the first shaft, a second sun gear coupled to a second shaft to be rotated in conjunction with the second shaft, a first planetary gear meshed with the first sun gear, a second planetary gear rotated with the first planetary gear and meshed with the second sun gear, a carrier supporting the first and second planetary gears, and a housing supporting the second shaft upon rotation, wherein the sun gears and the planetary gears have profile shifted teeth of which addendum modifications are different at the positions in a flank width direction and a nut screwed on the mid way of the second shaft, and a through hole disposed at a position facing the nut are provided.

10 Claims, 9 Drawing Sheets

DIFFERENTIAL GEAR APPARATUS

CROSS-REFERENCE TO RELATED APPLICATION

This non-provisional application claims priority under 35 U.S.C. §119(a) on Patent Application No. 2005-18174 filed in Japan on Jan. 26, 2005 and Patent Application No. 2005-64533 filed in Japan on Mar. 8, 2005, the entire contents of which are hereby incorporated by reference.

BACKGROUND OF THE INVENTION

1. Field of the Invention

The present invention relates to a differential gear apparatus provided with a planetary gear.

2. Description of the Related Art

A differential gear apparatus provided with a planetary gear is used for a steering apparatus of a vehicle. The differential gear apparatus for the steering apparatus has a sun gear having a first shaft that is connected to a steering wheel, three planetary gears meshed with the sun gear while orbiting around the sun gear and rotating on its axis, and an internal gear meshing with the planetary gears and mounted on a second shaft that is disposed coaxially with the first shaft and away from the sun gear, and a carrier rotatably fitted and mounted to the first shaft and supporting the planetary gears. The differential gear apparatus is constituted so as to rotate the second shaft through the first shaft, the sun gear, the planetary gears, the carrier, and the internal gear by the operation of the steering wheel and to operate a steering mechanism connected to the second shaft (for example, Japanese Patent Application Laid-Open No. 61-122071 (1986)).

However, since a standard spur gear is used for the sun gear and the planetary gears disclosed in Japanese Patent Application Laid-Open No. 61-122071 (1986), there is a problem such that backlash of a mesh portion between the sun gear and the planetary gear is hardly adjusted. In addition, when an inversed input load in an axial direction is applied from a steering mechanism connected to a pair of right and left steering wheels to the second shaft, the inverted input load is directly applied to the mesh portion between the sun gear and the planetary gear. Therefore, there is a problem that the tooth of the mesh portion is easily damaged.

Further, the differential gear apparatus provided with the planetary gear is processed with a high degree of accuracy as compared to a general gear such as a spur gear or the like because the planetary gear orbits and rotates on its axis. However, the process with a high degree of accuracy is difficult to carry out and the cost of the planetary gear is relatively expensive. Accordingly, to provide three and more planetary gears leads to the high cost of the differential gear apparatus because the process with a high degree of accuracy is difficult to carry out and the cost of the planetary gear is relatively expensive. In addition, in the case that the carrier supporting planetary gears is provided with fitting holes for the planetary gears formed at three and more peripheral positions at even intervals, there is a problem that it is difficult to process the fitting holes with a high degree of accuracy at even intervals and the cost of the differential gear apparatus is relatively expensive.

BRIEF SUMMARY OF THE INVENTION

The present invention has been made with the aim of solving the above problem, and it is an object of the present invention to provide a differential gear apparatus which can easily adjust a backlash amount of a mesh portion between a sun gear and a planetary gear and can prevent damage of tooth of the mesh portion due to an inverted input load.

Further, it is another object of the present invention to provide a differential gear apparatus which can easily obtain a fitting hole for a planetary gear with a high degree of accuracy and can reduce the entire cost.

The differential gear apparatus according to a first aspect is a differential gear apparatus comprising: a first sun gear coupled to a freely rotatable first shaft to be rotated in conjunction with the first shaft; a second sun gear coupled to a freely rotatable second shaft to be rotated in conjunction with the second shaft; a first planetary gear meshed with the first sun gear; a second planetary gear rotated with the first planetary gear and meshed with the second sun gear; and a carrier supporting the first and second planetary gears, characterized in that the sun gears and the planetary gears have profile shifted teeth of which addendum modifications are different at the positions in a flank width direction.

The differential gear apparatus according to a second aspect is characterized by further comprising a nut screwed to the first shaft or the second shaft.

The differential gear apparatus according to a third aspect is further comprising a housing for housing the nut and housing and supporting the first shaft or the second shaft to which the nut is screwed, wherein the nut has an engagement portion at its outside, and the housing has a through hole at a position facing the engagement portion.

The differential gear apparatus according to a fourth aspect is further comprising: a first bearing supporting a first shaft or a second shaft, to which the nut is screwed; a pressure body abutting on the first bearing and pressurizing the first bearing in a center line direction; and a fitting ring abutting on the carrier and fitting the nut between the first bearing and itself.

The differential gear apparatus according to a fifth aspect is a differential gear apparatus comprising: a freely rotatable sun gear; a freely rotatable internal gear arranged on an outer circumference of the sun gear; a planetary gear meshed with the sun gear and the internal gear; a freely rotatable carrier supporting the planetary gear; a first shaft coupled to any one of the sun gear, the internal gear, and the carrier to be rotated in conjunction with it; and a second shaft coupled to the other one of the sun gear, the internal gear, and the carrier to be rotated in conjunction with it, characterized by comprising: a nut screwed into the first shaft or the second shaft, wherein the sun gear, the internal gear, and the planetary gear have profile shifted teeth of which addendum modifications are different at the positions in a flank width direction.

The differential gear apparatus according to a sixth aspect is a differential gear apparatus comprising: a freely rotatable first and second sun gears; a first planetary gear meshed with the first sun gear; a second planetary gear rotated with the first planetary gear and meshed with the second sun gear; and a carrier supporting the first and second planetary gears so that the first and second planetary gears freely rotate on their axes or orbit and having a fitting hole at its rotation center part, characterized in that the carrier has fitting holes at positions bisected in a circumferential direction, and the planetary gears are supported in the bisected fitting holes.

The differential gear apparatus according to a seventh aspect is a differential gear apparatus comprising: a freely rotatable sun gear; a freely rotatable internal gear arranged on an outer circumference of the sun gear; a planetary gear meshed with the sun gear and the internal gear; and a carrier supporting the planetary gear so that the planetary gear freely rotates or orbits, characterized in that the carrier has a fitting hole at a position bisected in a circumferential direction, and the planetary gear is supported in the bisected fitting hole.

According to the first aspect, since the sun gear and the planetary gear have profile shifted teeth of which addendum modifications are different at positions in a flank width direction, by moving any two of the first shaft, the second shaft, and the planetary gear in the axial direction upon assembly of the differential gear apparatus, it is possible to bring the tooth flank of the first sun gear into contact with the tooth flank of the first planetary gear and to bring the tooth flank of the second sun gear into contact with the tooth flank of the second planetary gear. Therefore, by the simple operation to merely move any two of the first shaft, the second shaft, and the planetary gear in the axial direction, it is possible to adjust both of the backlash amount of the mesh portion between the second sun gear and the second planetary gear and the backlash amount of the mesh portion between the first sun gear and the first planetary gear, thereby preventing generation of an abnormal noise caused by the backlash amount of the mesh portion.

According to the second aspect, by rotating the first shaft or the second shaft to which the nut is screwed with the rotation and the movement in the axial direction of the nut that is screwed into the first shaft or the second shaft prohibited, the first shaft or the second shaft relatively moves in the axial direction, the first sun gear abuts on the first planetary gear, and the first and second planetary gears integrally move in the flank width direction. As a result, it is possible to adjust both of the backlash amount of the mesh portion between the second sun gear and the second planetary gear and the backlash amount of the mesh portion between the first sun gear and the first planetary gear. In addition, by connecting the first shaft or the second shaft to which the nut is screwed to the steering mechanism, the inversed input load can be applied to the nut and the member that prohibits the nut from moving in the axial direction. Therefore, the damage of the tooth of the mesh portion due to the inversed input load can be prevented.

According to the third aspect, by inserting a bar-shaped locking member into a through hole of a housing and meshing the locking member with an engagement portion of the nut, the rotation and the movement in the axial direction of the nut can be prohibited. Therefore, in the case of adjusting the backlash amount of the mesh portion, the backlash amount of the mesh portion can be adjusted by inserting the bar-shaped locking member into the through hole and rotating the first shaft or the second shaft to which the nut is screwed with the rotation and the movement in the axial direction of the nut prohibited.

According to the fourth aspect, by operating a pressure body, the force in a center axial direction can be applied to the first bearing, the nut, and the fitting body, and further, the force can be applied from the fitting body to the carrier. Therefore, it is possible to reduce trembling of the first bearing and the carrier in a rotation center line direction and further, the generation of the abnormal noise due to trembling can be prevented.

According to the fifth aspect, since the sun gear and the planetary gear have profile shifted teeth of which addendum modifications are different at positions in a flank width direction, by rotating the first shaft or the second shaft to which the nut is screwed with the rotation and the movement in the axial direction of the nut prohibited, the first shaft or the second shaft moves in the axial direction and the backlash amount of the mesh portion between the sun gear and the planetary gear can be adjusted. In addition, since the inversed input load can be applied to the nut and the member that prohibits the nut from rotating and moving in the axial direction by connecting the first shaft or the second shaft to which the nut is screwed to the steering mechanism, the damage of the tooth of the mesh portion due to the inversed input load can be prevented.

According to the sixth and seventh aspects, since three fitting holes are arranged on one line perpendicular to the rotational center line of the carrier, during linearly moving a tool for process of the fitting hole, three fitting holes can be processed, and as compared to the case of processing the fitting holes at three and more peripheral positions, the fitting hole with a high degree of accuracy can be easily processed. In addition, since two planetary gears are supported by the carrier, the cost of the differential gear apparatus can be decreased.

The above and further objects and features of the invention will more fully be apparent from the following detailed description with accompanying drawings.

DETAILED DESCRIPTION OF THE INVENTION

The following description will explain in detail the present invention, based on the drawings illustrating some embodiments thereof.

Embodiment 1

Figure 1:
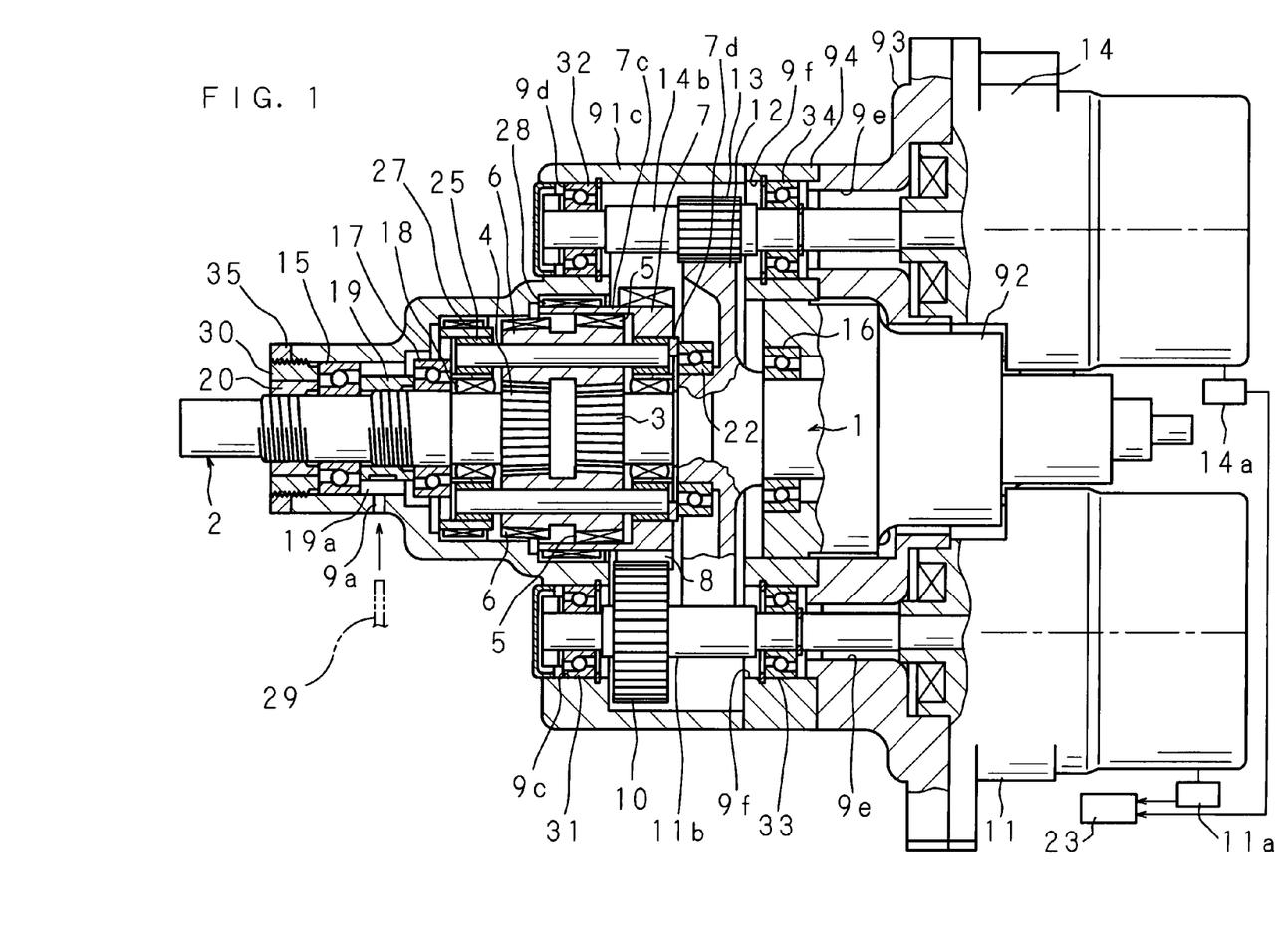
FIG. 1 is a cross sectional view showing the structure of a differential gear apparatus according to Embodiment 1 of the present invention.
Figure 2:
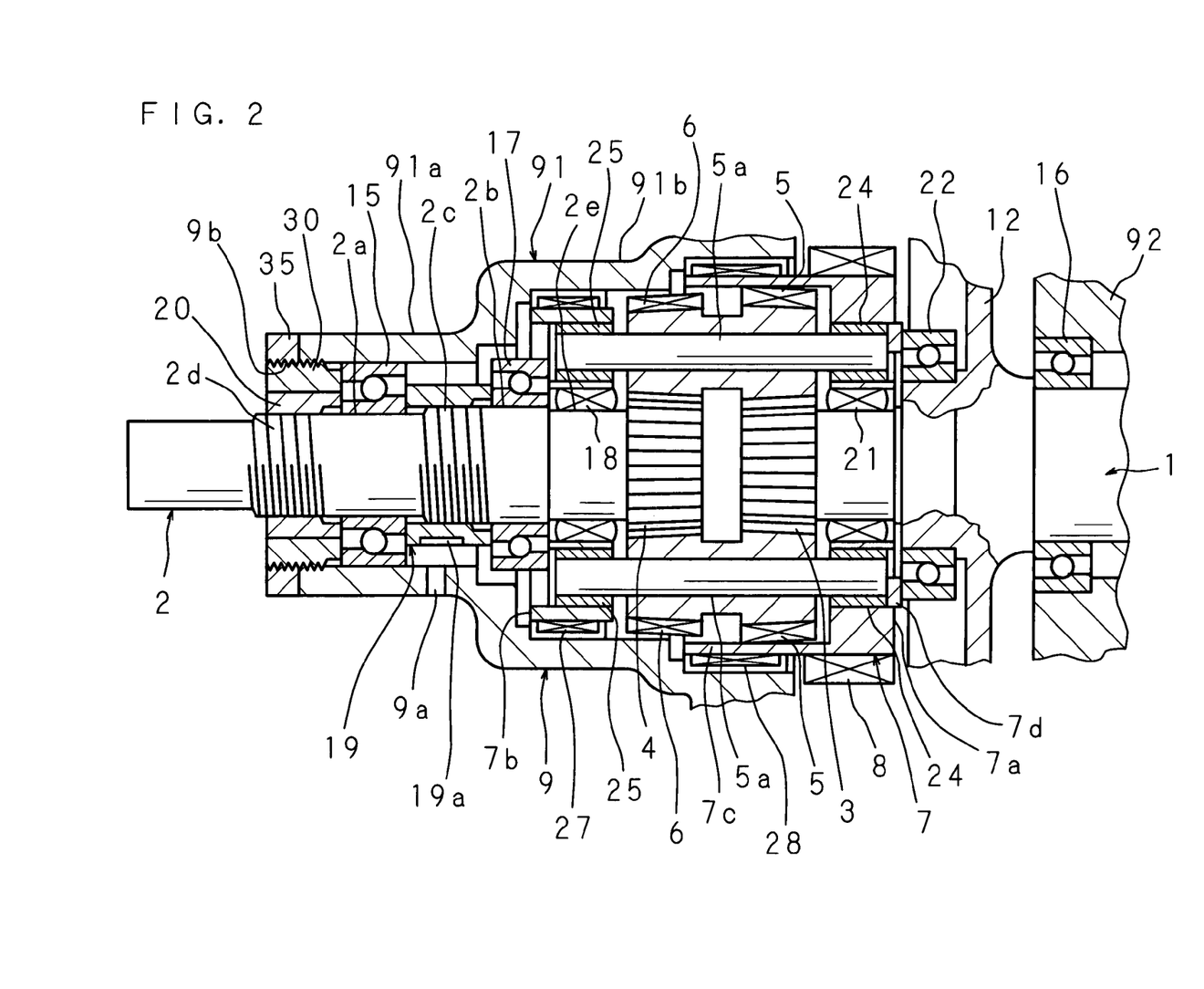
FIG. 2 is an enlarged cross sectional view showing the essential structure of the differential gear apparatus according to Embodiment 1 of the present invention.

FIG. 1 is a cross sectional view showing the structure of a differential gear apparatus according to Embodiment 1 of the present invention, and FIG. 2 is an enlarged cross sectional view showing essential structure thereof.

The differential gear apparatus is provided with a first shaft 1 and a second shaft 2 arranged coaxially so as to be freely rotatable, a first sun gear 3 to which the first shaft 1 is coupled to be rotated coaxially in conjunction with it, a second sun gear 4 to which the second shaft 2 is connected to be rotated coaxially in conjunction with it, a plurality of first planetary gears 5 meshed with the first sun gear 3, a plurality of second planetary gears 6 meshed with the second sun gear 4 and rotating coaxially with the first planetary gears 5, a carrier 7 supporting the first and second planetary gears 5 and 6, an external toothed member 8 mounted on an outer circumference of the carrier 7, a differential electric motor 11 as an actuator having a driving gear 10 meshed with the tooth of the external toothed member 8 and rotating the carrier 7, a transmission gear 12 mounted on the mid way of the first shaft 1 and a reaction force electric motor 14 as an actuator having a driving gear 13 meshed with the transmission gear 12 and applying a required torque to the first shaft 1 in accordance with the torque applied to the second shaft 2, in other words, applying the reaction force torque in the same direction as the direction of the torque to be applied to the first shaft 1 when the torque to be applied to the first shaft 1 is deviated from its correct level.

The first sun gear 3 is integrally disposed at one end portion of the first shaft 1, and the second sun gear 4 is integrally disposed at one end portion of the second shaft 2. The first and second sun gears 3 and 4 are opposed to each other coaxially. The second shaft 2 is housed and supported within a housing 9 via a first bearing 15 composed of an angular ball bearing so as to be freely rotatable and the first shaft 1 is housed and supported within the housing 9 via a second bearing 16 composed of the angular ball bearing so as to be freely rotatable. In addition, the second shaft 2 is loosely fitted in the inner ring of the first bearing 15 so as to move in the axial direction with respect to the first bearing 15.

The second shaft 2 has a first fitting portion 2*a* to be loosely fitted in the inner ring of the first bearing 15; a second fitting portion 2*b* disposed separated from the first fitting portion 2*a*; first and second screw portions 2*c* and 2*d* provided at the opposite sides of the first fitting portion 2*a*; and a third fitting portion 2*e* disposed between the second fitting portion 2*b* and the second sun gear 4. A fitting ring 17 composed of the angular ball bearing is fitted to the second fitting portion 2*b* and a needle roller bearing 18 is fitted to a third fitting portion 2*e*, respectively. At a first screw portion 2*c* between the first fitting portion 2*a* and the second fitting portion 2*b*, a nut 19 is screwed, which has a concave engagement portion 19*a* on its outer circumference and is fitted between the first bearing 15 and the fitting ring 17; and at a second screw portion 2*d*, a screw ring 20 is screwed, which abuts on the side face of the inner ring of the first bearing 15 to prohibit the rotation of the nut 19 with respect to the second shaft 2.

On the middle way of the first shaft 1, the transmission gear 12 is integrally provided and the first shaft 1 is supported in the housing 9 via the second bearing 16 in the vicinity of the transmission gear 12. Further, between the first sun gear 3 and the transmission gear 12, a needle roller bearing 21 for supporting the carrier 7 and a third bearing 22 composed of the angular ball bearing to receive the load in a thrust direction to be applied to the carrier 7 are fitted. In addition, a torque sensor (not illustrated) for detecting the torque to be applied to the first shaft 1 is provided on the outer circumference of the first shaft 1. Further, based on the torque or the like detected by the torque sensor, a controller 23 to control drive circuits 11*a* and 14*a* of the differential and reaction force electric motors 11 and 14, respectively, is provided.

Figure 3A:
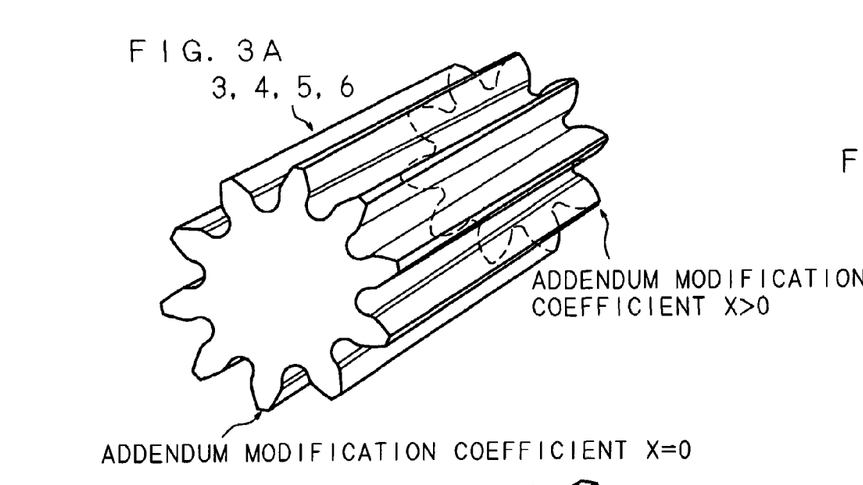
FIGS. 3A to 3C are perspective views showing the structure of a gear having a profile shifted tooth of which an addendum modification coefficient X is different.
Figure 3B:
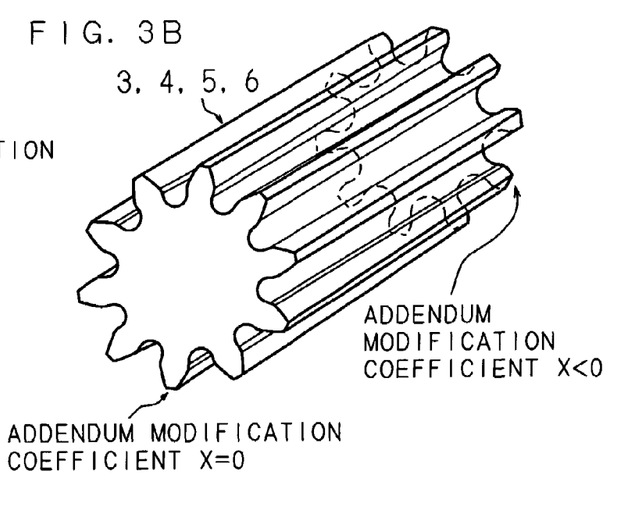
Figure 3C:
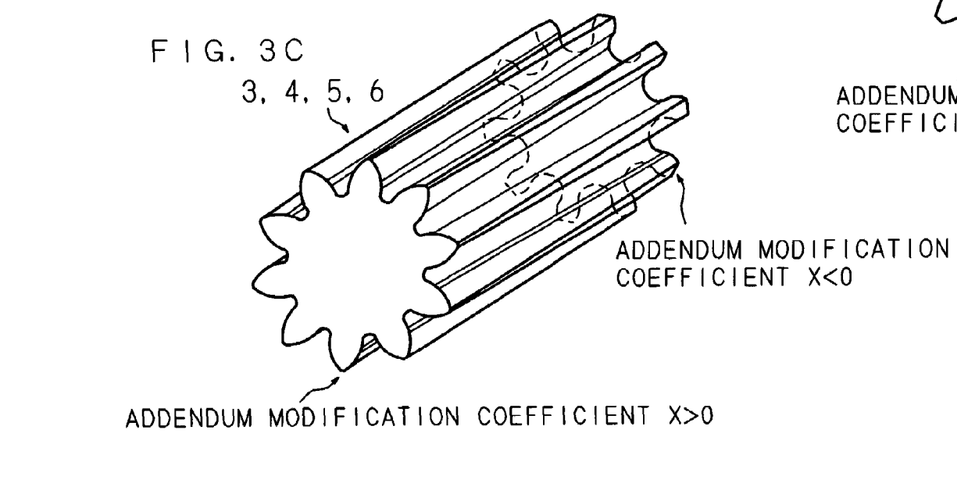

The first and second sun gears 3 and 4, and the first and second planetary gears 5 and 6 have the profile shifted teeth of which addendum modifications are different at the positions in the flank width direction. FIGS. 3A to 3C are perspective views showing the structure of a gear having a profile shifted tooth of which an addendum modification coefficient X is different. FIG. 3A shows a gear in which an addendum modification coefficient X at one side in a flank width direction equals to zero and an addendum modification coefficient X at the other side in a flank width direction is more than zero; FIG. 3B shows a gear in which an addendum modification coefficient X at one side in a flank width direction equals to zero and an addendum modification coefficient X at the other side in a flank width direction is less than zero; and FIG. 3C shows a gear in which an addendum modification coefficient X at one side in a flank width direction is more than zero and an addendum modification coefficient X at the other side in a flank width direction is less than zero.

The first and second sun gears 3 and 4 are formed in a cone trapezoid, of which diameter is smaller toward the adjacent side and the first and second planetary gears 5 and 6 are formed in a cone trapezoid, of which diameter is smaller toward a separated direction. When the second sun gear 4 moves to the side of the first sun gear 3, the backlash amount of the mesh portion between the second sun gear 4 and the second planetary gear 6 is made smaller and when the second sun gear 6 moves to the side of the first sun gear 3, the backlash amount of the mesh portion between the first sun gear 3 and the first planetary gear 5 is made smaller. Further, the profile shifted tooth is continuously shifted in the flank width direction, however, it may be shifted discontinuously.

The first and second planetary gears 5 and 6 are integrally formed coaxially, a shaft body 5*a* is fitted in the through hole penetrating through the center portion, and the opposite end portions of the shaft body 5*a* are supported by the carrier 7 via needle roller bearings 24 and 25 so as to be freely rotatable.

The carrier 7 has an annular first plate part 7*a* that is fitted and supported on the outer circumference of the first shaft 1 via the needle roller bearing 21 so as to be freely rotatable, an annular second plate part 7*b* that is fitted and supported on the outer circumference of the second shaft 2 via the needle roller bearing 18 so as to be freely rotatable, a coupling member (not illustrated) to couple plural places of the outer circumferences of the first plate part 7*a* and the second plate part 7*b*, and a cylindrical part 7*c* arranged at the outside of the first planetary gears 5 to be continued to the outer circumference of the first plate part 7*a*. In addition, on the outer circumference of the first plate part 7*a*, the annular external toothed member 8 having plural teeth is integrally provided, and on the inner circumference of the first plate part 7*a*, an annular convex part 7*d* protruding to the outside is integrally provided.

On the two places in a circumferential direction of the first plate part 7*a*, the first planetary gears 5 and 5 are evenly arranged, and on the two places in a circumferential direction of the second plate part 7*b*, the second planetary gears 6 and 6 are evenly arranged. The second plate part 7*b* and the cylindrical part 7*c* are supported within the housing 9 via the needle roller bearings 27 and 28 so as to be freely rotatable.

The housing 9 is provided with a first cylindrical body 91 having a small diameter cylindrical part 91*a* housing and supporting the second shaft 2, a middle diameter cylindrical part 91*b* housing and supporting the carrier 7, and a large diameter cylindrical part 91*c* housing the driving gears 10 and 13; a second cylindrical body 92 housing and supporting the first shaft 1 and the torque sensor; a third cylindrical body 93 housing one end portion of the second cylindrical body 92; and an annular coupling plate 94 to couple the first cylindrical body 91 and the third cylindrical body 93.

The first cylindrical body 91 has a through hole 9*a* penetrating in a radial direction at a position facing the engagement portion 19*a* of the nut 19, and the rotation of the nut 19 (the rotation with the second shaft 2) can be prohibited by inserting the bar-shaped locking member 29 capable of being engaged with the engagement portion 19*a* into the through hole 9*a*. Further, the outer ring of the first bearing 15 is loosely fitted at the inside of the small diameter cylindrical part 91*a* and an internal thread 9b is disposed at the opening end portion and a screw ring 30 serving as a pressure body that abuts on the outer ring of the first bearing 15 and pressurizes the outer ring in a center line direction is screwed to the internal thread 9b. The needle roller bearing 28 is fitted at the inside of the middle diameter cylindrical part 91b. Two through holes 9c and 9d penetrating through the first shaft 1 in parallel and bearings 31 and 32 fitted to the through holes 9c and 9d are disposed at a step portion between the middle diameter cylindrical part 91b and the large diameter cylindrical part 91c.

One end of the second cylindrical body 92 is fitted and held at the inside of the coupling plate 94 and at the inside of the second cylindrical body 92, the first shaft 1 is supported via the second bearing 16 and the needle roller bearing (not illustrated).

The third cylindrical body 93 and the coupling plate 94 have insertion holes 9e, 9e, 9f, and 9f, through which output shafts 11b and 14b of the differential and reaction force electric motors 11 and 14 are inserted. Bearings 33 and 34 are fitted in the insertion holes 9f and 9f of the coupling plate 94, the output shaft 11b is supported by the bearings 31 and 33, and the output shaft 14b is supported by the bearings 32 and 34, respectively. The driving gear 10 is integrally disposed on the middle way of the output shaft 11b and the driving gear 13 is integrally provided on the middle way of the output shaft 14b. In addition, at the end portion of the third cylindrical body 93, the motor case of the electrical motors 11 and 14 are mounted.

In the differential gear apparatus configured as described above, in the case of adjusting both of the backlash amount of the mesh portion between the first sun gear 3 and the first planetary gear 5 and the backlash amount of the mesh portion between the second sun gear 4 and the second planetary gear 6, the locking member 29 is inserted into the through hole 9a of the housing 9 and engaged with the engagement portion of the nut 19, and the second shaft 2 is turned with the rotation of the nut 19 prohibited. Thereby, the second shaft 2 moves in the axial direction with respect to the nut 19, the profile shifted tooth of the second sun gear 4 abuts on the profile shifted tooth of the second planetary gear 6, the first and second planetary gears 5 and 6 integrally move in the flank width direction, the profile shifted tooth of the first planetary gear 5 abuts on the profile shifted tooth of the first sun gear 3, and both of the backlash amount of the mesh portion between the first sun gear 3 and the first planetary gear 5 and the backlash amount of the mesh portion between the second sun gear 4 and the second planetary gear 6 can be adjusted. In this way, by the simple operation to prohibit the rotation of the nut 19 and turn the second shaft 2, it is possible to adjust the backlash amount of the mesh portions at two places.

Further, in the case of adjusting the backlash amounts at the sides of the first and second sun gears 3 and 4 with the backlash amounts at the sides of the first and second sun gears 3 and 4 equal, by rotating the first shaft 1 or the carrier 7 with the backlash amount between the second sun gear 3 and the second planetary gear 6 reduced due to the movement of the second shaft 2, the planetary gears 5 and 6 slightly move to the side of the first sun gear 3 so that the mesh between the sun gears 3 and 4 becomes stable and as a result, the backlash amounts at the opposite sides can be reduced. In this way, by pulling out the locking member 29 from the through hole 9a after adjusting the backlash amount, the nut 19 can be rotated with the second shaft 2. In addition, by fastening the screw ring 20 after adjusting the backlash amount, the fitting force between the first bearing 15 and the fitting ring 17 of the nut 19 is increased and the loose of the nut 19 is inhibited.

In addition, by turning the screw ring 30 that is screwed to the housing 9, the operational force of the screw ring 30 can be applied to the second cylindrical body 92 through the outer ring, the ball, and the inner ring of the first bearing 15; the nut 19; the inner ring, the ball, and the outer ring of the fitting ring 17; the carrier 7; and the annular convex part 7d; and further through the outer ring, the ball, and the inner ring of the third bearing 22; the first shaft 1; and the inner ring, the ball, and the outer ring of the second bearing 16. As a result, it is possible to remove the trembling at the rotational part, in detail, the trembling at the first shaft 1, the second shaft 2, the carrier 7, and the first bearing 15, the fitting ring 17, the second bearing 16, and the third bearing 22. In this way, by removing the trembling at the rotational parts and then screwing a lock nut 35 to the screw ring 30, the rotation of the screw ring 30 can be locked, thus keeping the state without the trembling.

The differential gear apparatus configured as described above is mainly used for a steering apparatus of a vehicle. The steering apparatus is constructed in a manner such that the first shaft 1 is joined to the steering wheel, a steering mechanism includes a pinion gear and a rack shaft which is provided with a rack gear meshed with the pinion gear and which enables its movement in the axial direction, the second shaft 2 is joined to the pinion gear in the steering mechanism to be rotated in conjunction with it, and the pinion gear is rotated by operating the steering wheel, and thus conducting the action of steering control wheels mounted to both ends of the rack shaft.

In the steering apparatus configured in this way, when the first shaft 1 is rotated by the steering wheel, the second shaft 2 is rotated at the same speed as the first shaft 1 through the first sun gear 3, the first and second planetary gears 5 and 6, and the second sun gear 4. In addition, when the differential electric motor 11 is driven by an instruction signal to be outputted from the controller 23 to the drive circuit 11a, the carrier 7 is rotated through the driving gear 10 and the external toothed member 8 and the rotational speed of the second shaft 2 is increased through the first and second planetary gears 5 and 6 and the second sun gear 4. When the steering torque to be applied to the first shaft 1 is deviated from its correct level due to the increase of the rotational speed of the second shaft 2, the reaction force electric motor 14 is driven by the instruction signal to be outputted from the controller 23 to the drive circuit 14a in accordance with the torque or the like to be applied to the second shaft 2, for example, the reaction force torque in the same direction as the rotational direction of the first shaft 1 is applied to the first shaft 1, thus returning the steering torque to be applied to the first shaft 1 to the correct level.

In addition, when the steering control wheel of the vehicle runs on a curbstone or the like and the inverted input load in the axial direction is applied to the second shaft 2 from the steering mechanism, the inverted input load can be applied to the carrier 7 from the nut 19 through the fitting ring 17. Further, the inverted input load can be applied from the carrier 7 to the housing 9 through the third bearing 22, the first shaft 1, and the second bearing 16. Therefore, it is possible to prevent the inverted input load from being applied to the mesh portions between the sun gears 3 and 4 and the planetary gears 5 and 6 and to prevent the damage of the teeth of the mesh portions.

Embodiment 2

Figure 4:
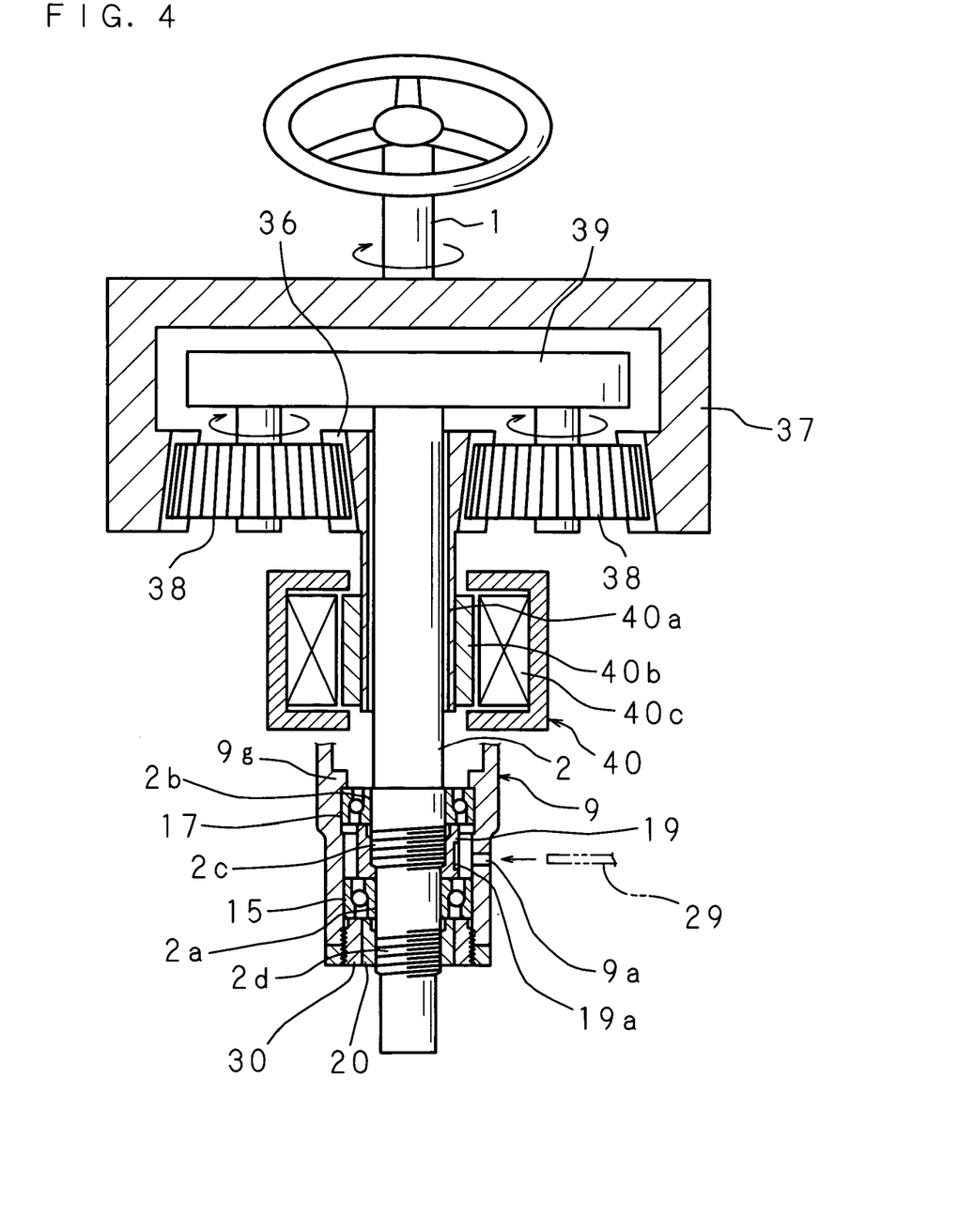
FIG. 4 is a schematic diagram showing the structure of the differential gear apparatus according to Embodiment 2 of the present invention.

FIG. 4 is a schematic diagram showing the structure of the differential gear apparatus according to Embodiment 2 of the present invention. The differential gear apparatus is provided with the first shaft 1 and the second shaft 2 arranged coaxially so as to be freely rotatable; a sun gear 36 fitted and supported to the second shaft 2 so as to be freely rotatable; an internal gear 37 which is arranged on the outer circumference of the sun gear 36 so as to be freely rotatable and to which the first shaft 1 is coupled to be rotated in conjunction with it coaxially; a plurality of planetary gears 38 meshed with the sun gear 36 and the internal gear 37; a carrier 39 which supports the planetary gears 38 and to which the second shaft 2 is coupled to be rotated coaxially in conjunction with it; and a differential electric motor 40 serving as the actuator that is arranged on the outer circumference of the second shaft 2. A cylindrical rotator 40a of the electric motor 40 is coupled to the sun gear 36 coaxially to be rotated in conjunction with it.

According to Embodiment 2, the internal gear 37 is formed in a cylindrical shape with a bottom having a tooth on the inner circumference thereof and the first shaft 1 is coupled to the center portion of the bottom. The sun gear 36 is formed to be integrated with the rotator 40a as a movable part, a permanent magnet 40b is disposed on the outer circumference of the rotator 40a, and a stator 40c is disposed on the outer circumference of the permanent magnet 40b. The carrier 39 is formed in a disk shape and the planetary gears 38 and 38 are symmetrically mounted at two deflected locations from the rotational center.

The sun gear 36, the internal gear 37, and the planetary gears 38 have the profile shifted teeth of which addendum modifications are different at the positions in the flank width direction, and are formed in a cone trapezoid. The profile shifted teeth of the sun gear 36, the internal gear 37, and the planetary gears 38 are configured as shown in FIGS. 3A to 3C.

The second shaft 2 is supported within the housing 9 via the first bearing 15 so as to be freely rotatable. In the second shaft 2, the first fitting portion 2a to which the first bearing 15 is fitted, the second fitting portion 2b to which the fitting ring 17 is fitted, and the first and second screw portions 2c and 2d are provided. The nut 19 screwed to the first screw portion 2c is fitted between the inner ring of the first bearing 15 and the inner ring of the fitting ring 17. In addition, the external ring of the fitting ring 17 abuts on a step portion 9g within the housing 9. In addition, a through hole 9a is disposed at a position facing the nut 19 of the housing 9.

According to Embodiment 2, in the case of adjusting both of the backlash amount of the mesh portion between the sun gear 36 and the planetary gear 38 and the backlash amount of the mesh portion between the planetary gear 38 and the internal gear 37, by inserting the locking member 29 in the through hole 9a of the housing 9, engaging the locking member 29 with the engagement portion of the nut 19, and turning the second shaft 2 with the rotation of the nut 19 prohibited, the second shaft 2 moves in the axial direction with respect to the nut 19, the carrier 39 coupled to the second shaft 2 to be rotated in conjunction with it and the planetary gears 38 supported by the carrier 39 move in the flank width direction, thus adjusting both of the backlash amount of the mesh portion between the sun gear 36 and the planetary gear 38 and the backlash amount of the mesh portion between the planetary gear 38 and the internal gear 37. In this way, by the simple operation to prohibit the rotation of the nut 19 and turn the second shaft 2, it is possible to adjust the backlash amount of the mesh portions at two places.

In addition, by turning the screw ring 30 that is screwed to the housing 9, the operational force of the screw ring 30 can be applied to the step portion 9g of the housing 9 through the outer ring, the ball, and the inner ring of the first bearing 15; the nut 19; the inner ring, the ball, and the outer ring of the fitting ring 17. As a result, it is possible to remove the trembling at the second shaft 2 and the first bearing 15.

Further, when the steering control wheel of the vehicle runs on the curbstone or the like and the inverted input load in the axial direction is applied to the second shaft 2 from the steering mechanism, the inverted input load can be applied to the step portion 9g of the housing 9 from the nut 19 through the fitting ring 17. Therefore, it is possible to prevent the inverted input load from being applied to the mesh portions between the sun gear 36, the planetary gears 38, and the internal gear 37, and to prevent the damage of the teeth of the mesh portions.

Although a reaction force electric motor is not illustrated in Embodiment 2, another structure may also be employed for Embodiment 2 in which the transmission gear is provided in the middle of the first shaft 1 as in Embodiment 1, and a reaction force electric motor having a drive gear meshing with the transmission gear and applying a required torque force to the first shaft 1 in response to a torque which has been applied to the second shaft 2 when the torque applied to the first shaft 1 is deviated from its correct steering torque is provided.

The other arrangements and actions are identical to those of Embodiment 1 and will be described in no more detail while like components are denoted by like numeral.

Further, in the above-described Embodiment 1 and Embodiment 2, the electric motors 11 and 14 are used as the actuator for the differential and the reaction force, however, the actuator for the differential and the reaction force is not specified to the electric motor.

In addition, in the above-described Embodiment 1 and Embodiment 2, the differential and reaction force electric motors (actuators) 11 and 14 are provided, however, the reaction force electric motor (actuator) 14 is not always necessary.

In addition, in Embodiment 1, the differential electric motor 11 rotates the carrier 7, however, for example, the electric motor 11 may directly rotate the second shaft 2.

Further, in the above-described Embodiment 1 and Embodiment 2, the nut 19 is screwed into the second shaft 2, however, the nut 19 may be screwed into the first shaft 1 and the first shaft 1 may be enabled to move in the axial direction with respect to the nut 19. In addition, the angular ball bearing is used as the means of prohibiting movement of the nut 19 in the axial direction, however, an annular member such as a retaining ring or the like may be used in place of the angular ball bearing.

Further, according to the above-described Embodiment 1 and Embodiment 2, the annular member such as the bearing is provided as the means of prohibiting movement of the nut 19 in the axial direction, and the locking member 29 is provided as the means of prohibiting the rotation of the nut 19. However, the locking member 29 may prohibit the movement and the rotation of the nut 19 in the axial direction in place of the annular member.

In addition, in Embodiment 2, by coupling the internal gear 37 to the first shaft 1 so as to be rotated in conjunction with the first shaft 1 and coupling the carrier 39 to the second shaft 2 so as to be rotated in conjunction with the second shaft 2, the differential electric motor 40 rotates the sun gear 36. However, in FIG. 4, the first shaft 1 may be provided with the sun gear 36, the carrier 39 may be coupled to the rotator 40a of the electric motor 40 to be rotated in conjunction with the rotator 40a, and the carrier 39 may be rotated by the electric motor 40. In addition, in FIG. 4, the carrier 39 may be coupled to the first shaft 1 so as to be rotated in conjunction with the first shaft 1, the internal gear 37 is coupled to the rotator 40a of the electric motor 40 to be rotated in conjunction with the rotator 40a, and the second shaft 2 may be provided with the sun gear 36. Further, in FIG. 4, the first shaft 1 may be provided with the sun gear 36, the internal gear 37 may be coupled to the rotator 40a of the electric motor 40 to be rotated in conjunction with the rotator 40a, and the second shaft 2 may be provided with the carrier 39.

Embodiment 3

Figure 5:
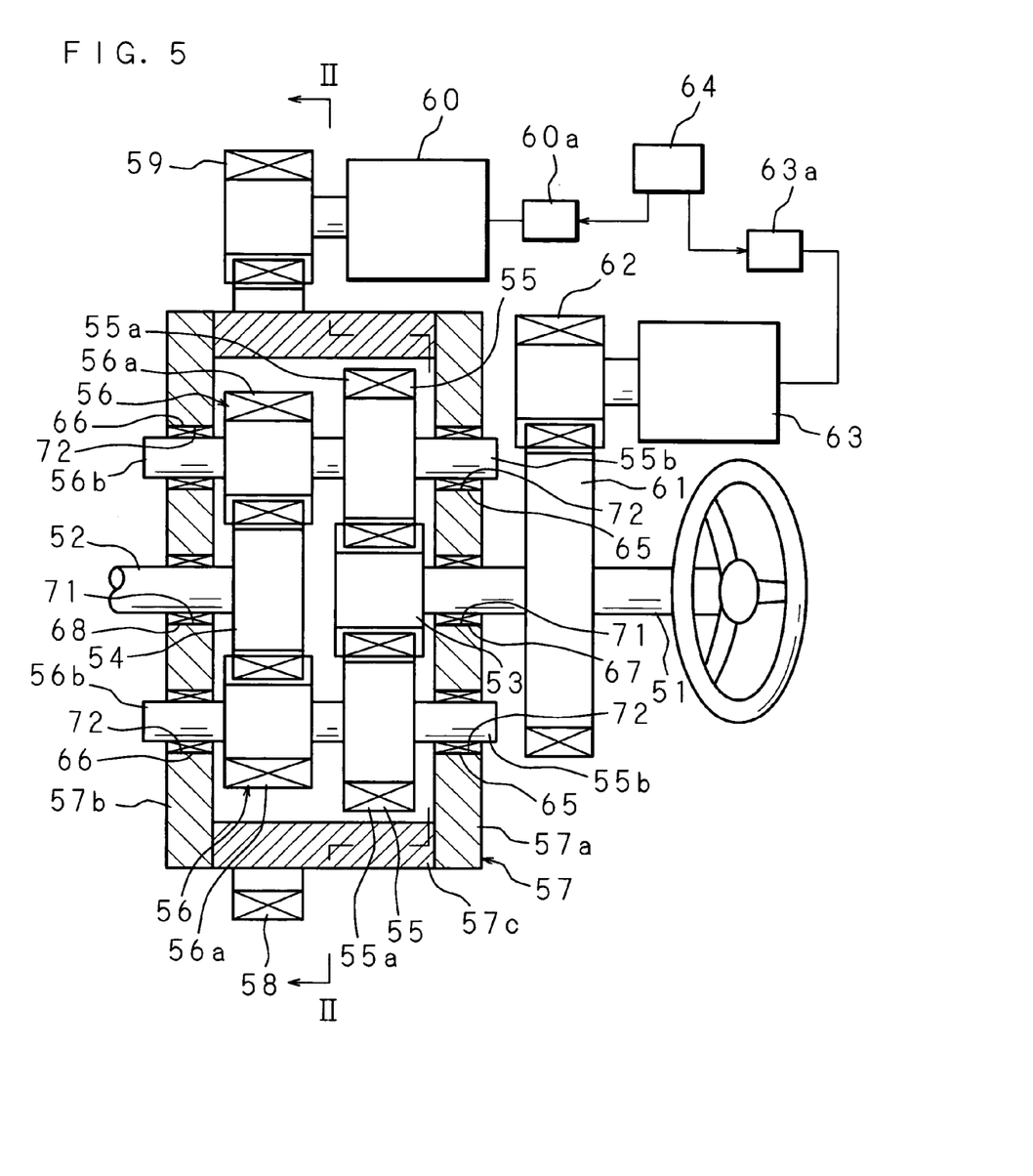
FIG. 5 is a cross sectional view showing the structure of the differential gear apparatus according to Embodiment 3 of the present invention.
Figure 6:
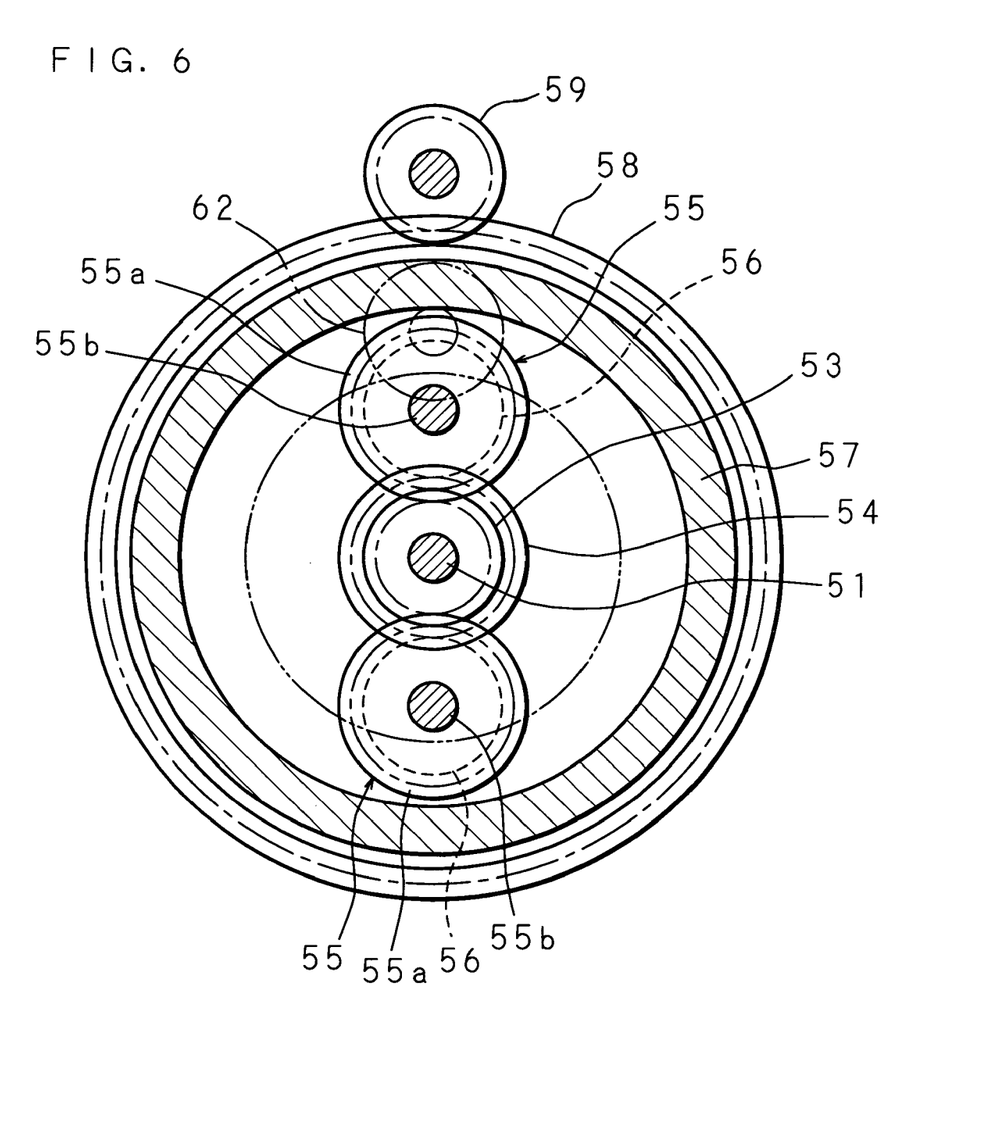
FIG. 6 is a cross sectional view taken along the line II-II of FIG. 5.
Figure 7:
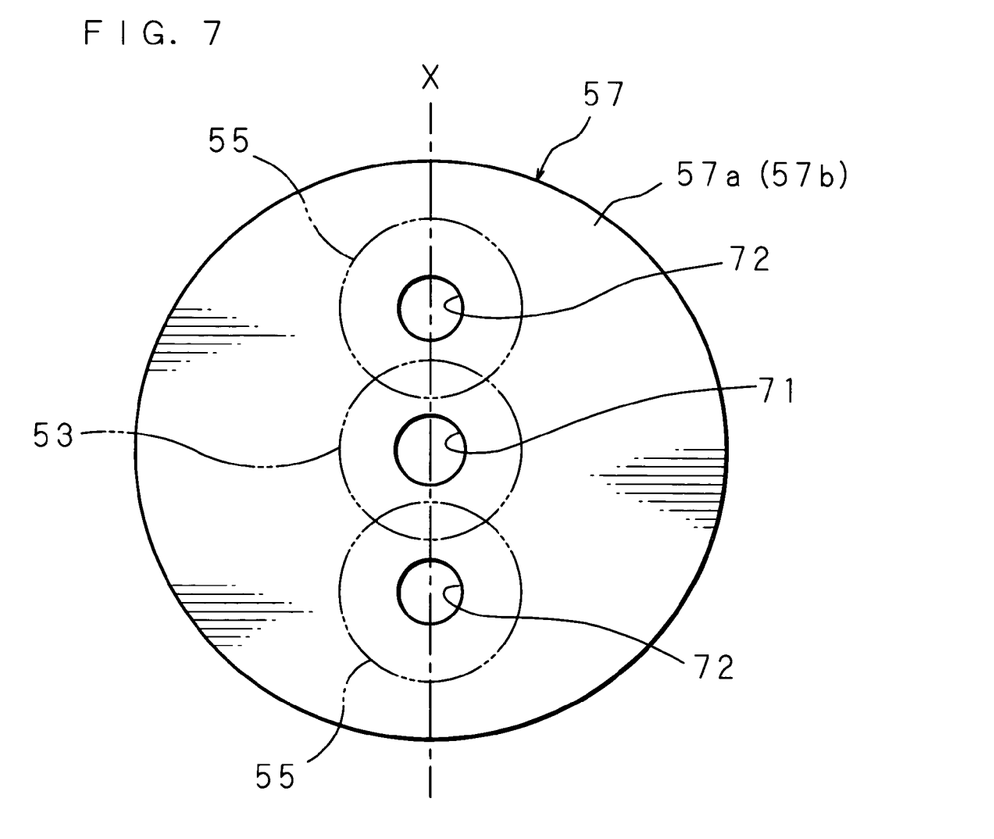
FIG. 7 is a side view showing a carrier of the differential gear apparatus according to Embodiment 3 of the present invention.

FIG. 5 is a cross sectional view showing the structure of the differential gear apparatus according to Embodiment 3 of the present invention, FIG. 6 is a cross sectional view taken along the line II-II of FIG. 5, and FIG. 7 is a side view of a carrier.

The rotation transmitting apparatus is provided with a first shaft 51 and a second shaft 52 that are arranged coaxially so as to be freely rotatable; a first sun gear 53 to which the first shaft 51 is coupled coaxially to be rotated in conjunction with it; a second sun gear 54 to which the second shaft 52 is connected coaxially to be rotated in conjunction with it; two first planetary gears 55 meshed with the first sun gear 53; two second planetary gears 56 meshed with the second sun gear 54, which is rotated coaxially with the first planetary gears 55; a carrier 57 supporting the first and second planetary gears 55 and 56; an external toothed member 58 provided on an outer circumference of the carrier 57; and a differential electric motor 60 as an actuator having a first driving gear 59 meshed with the tooth of the external toothed member 58 and rotating the carrier 57; a transmission gear 61 provided on the mid way of the first shaft 51; and a reaction force electric motor 63 as an actuator having a second driving gear 62 meshed with the transmission gear 61 and applying the reaction force in the opposite direction of the torque to be applied to the first shaft 51 to the first shaft 51.

The first shaft 51 and the second shaft 52 are supported via the bearings to a stationary member so as to be freely rotatable, and the first and second sun gears 53 and 54 are opposed to each other coaxially. On the outer circumference of the first shaft 51, a torque sensor for detecting the torque to be applied to the first shaft 51 is provided. Further, on the basis of the torque or the like detected by the torque sensor, a controller 64 to control drive circuits 60a and 63a of the differential and reaction force electric motors 60 and 63, respectively, is provided.

The first and second planetary gears 55 and 56 have tooth parts 55a and 56a that are disposed separated in the flank width direction and shaft parts 55b and 56b that are protruded from the tooth parts 55a and 56a to the outside in the flank width direction. Needle roller bearings 65 and 66 are fitted and mounted to the shaft parts 55b and 56b.

The carrier 57 has a first plate part 57a formed in a disk that is fitted and supported on the outer circumference of the first shaft 51 via a needle roller bearing 67 so as to be freely rotatable, a second plate part 57b formed in a disk that is fitted and supported on the outer circumference of the second shaft 52 via a needle roller bearing 68 so as to be freely rotatable, and a coupling cylindrical part 57c to couple the outer circumferences of the first plate part 57a and the second plate part 57b by the coupling means such as a bolt or the like. On the outer circumference of the coupling cylindrical part 57c, the annular external toothed member 58 having plural teeth is integrally provided.

A first fitting hole 71 is provided at the rotational center of the first plate part 57a and the second plate part 57b respectively and two second fitting holes 72 and 72 are disposed at two positions deflected from the rotational center and bisected in the circumferential direction. In other words, the first and second fitting holes 71, 72 and 72 are arranged on one line X that is perpendicular to the rotational center line of the carrier 57 in parallel with each other. In the first fitting hole 71, the first shaft 51 is fitted via the needle roller bearing 67 and in the second fitting holes 72 and 72, the shaft parts 55b and 56b of the first and second planetary gears 55 and 56 are fitted via the needle roller bearings 65 and 66.

Figure 8:
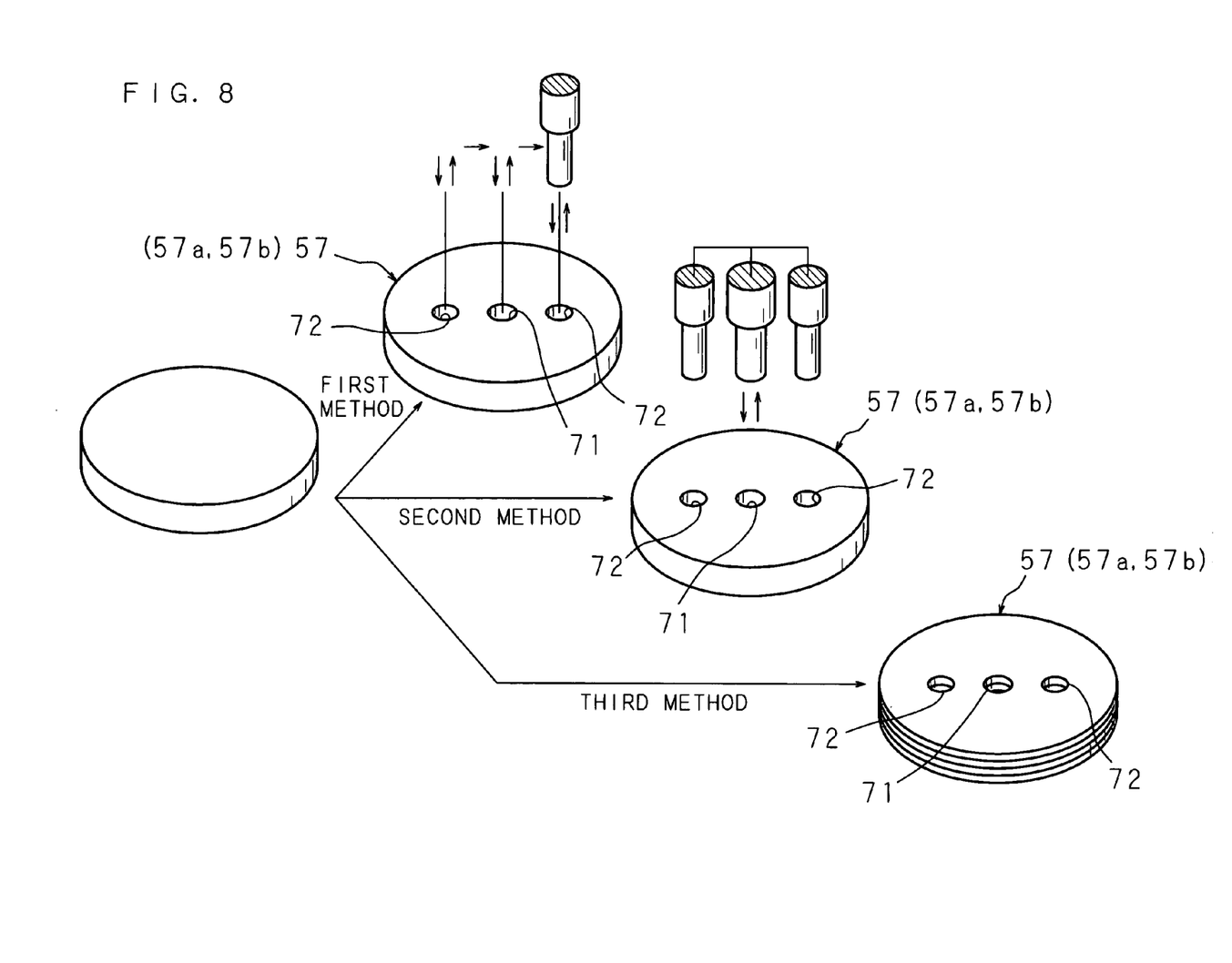
FIG. 8 is an explanatory view showing a processing method of the carrier of the differential gear apparatus according to Embodiment 3 of the present invention.

FIG. 8 is an explanatory view showing a processing method of the carrier of the differential gear apparatus according to Embodiment 3 of the present invention. The processes of the first plate part 57a and the second plate part 57b of the carrier 57 having the first and second fitting holes 71, 72 and 72 disposed on one line perpendicular to the rotational center line as described above will be carried out, for example, by the following first, second, and third methods.

First method: By moving up and down and/or linearly moving a tool for process of the fitting hole such as a punch among three positions on one line of a metal plate formed in a disk shape, the first and second fitting holes 71, 72 and 72 are pressed. In this case, as compared to the case of processing the fitting holes evenly divided at three and more positions in the circumferential direction, it is possible to easily position the fitting holes 71, 72 and 72 and to simply process them.

Second method: By moving up and down three tools for process of the fitting hole such as a punch on the metal plate formed in a disk shape, the first and second fitting holes 71, 72 and 72 are pressed at once. In this case, it is possible to process the fitting holes 71, 72 and 72 with different inner diameters at a high degree of accuracy and simply.

Third method: After processing the first and second fitting holes 71, 72 and 72 on the relatively thin disk metal plate according to the first or second method, a plurality of perforated disk metal plates is layered so that the first and second fitting holes 71, 72 and 72 are arranged concentrically to integrally couple the layered disk metal plates by the coupling means such as caulking or the like. In this case, since the first and second fitting holes 71, 72 and 72 are pressed on the relatively thin disk metal plate, it is possible to improve the processing accuracy of the fitting holes 71, 72 and 72.

The differential gear apparatus configured as described above is mainly used for the steering apparatus of the vehicle. The steering apparatus is constructed in a manner such that the first shaft 51 is joined to a steering wheel of the vehicle, a steering mechanism includes a pinion gear and a rack shaft which is provided with a rack gear arranged in mesh with the pinion gear and which enables its movement in the axial direction, and the second shaft 52 is joined to the pinion gear in the steering mechanism to be rotated in conjunction with it, thus conducting the action of steering control wheels mounted to both ends of the rack shaft.

In the steering apparatus configured in this way, when the steering wheel rotates the first shaft 51, the second shaft 52 is rotated at the same speed as the first shaft 51 through the first sun gear 53, the first and second planetary gears 55 and 56, and the second sun gear 54. In addition, when the differential electric motor 60 is driven by an instruction signal to be outputted from the controller 64 to the drive circuit 60a, the carrier 57 is rotated through the driving gear 59 and the external toothed member 58, and the rotational speed of the second shaft 52 is increased through the first and second planetary gears 55 and 56 and the second sun gear 54. When the torque to be applied to the first shaft 51 is decreased due to the increase in the rotational speed of the second shaft 52, the reaction force electric motor 63 is driven by the instruction signal to be outputted from the controller 64 to the drive circuit 63a, the reaction force in the opposite direction of the rotational direction of the first shaft 51 is applied to the first shaft 51 thus returning the torque to be applied to the first shaft 51 to a predetermined value.

Embodiment 4

Figure 9:
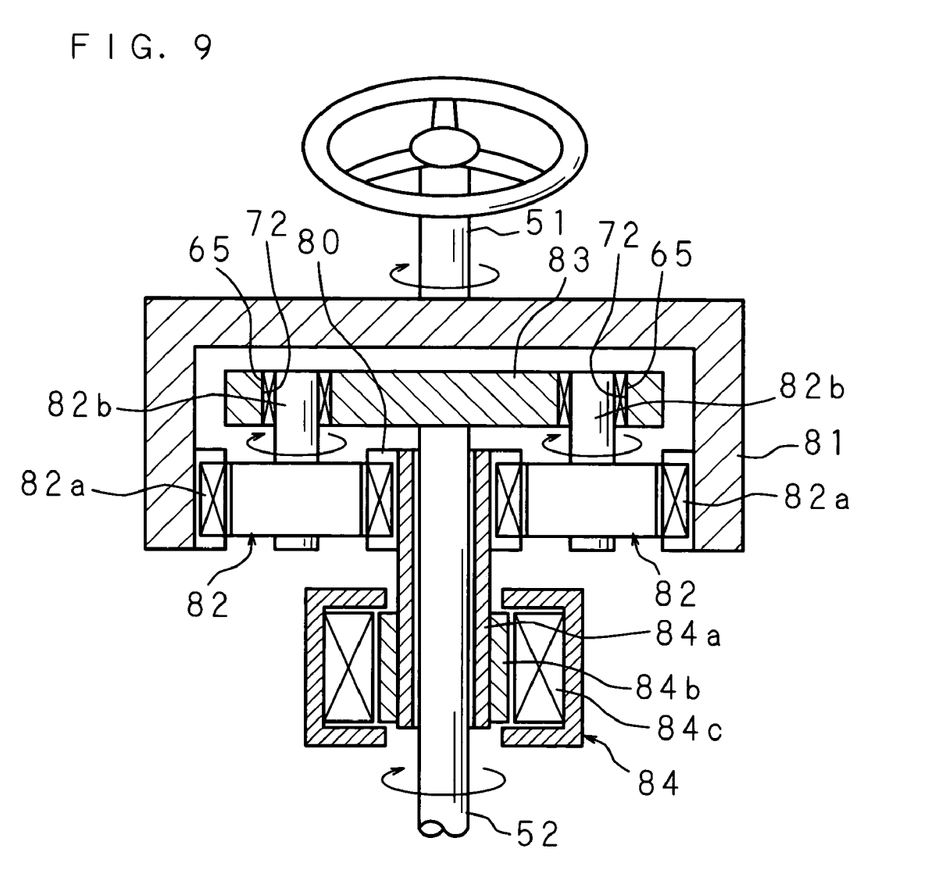
FIG. 9 is a schematic diagram showing the structure of the differential gear apparatus according to Embodiment 4 of the present invention.

FIG. 9 is a schematic diagram showing the structure of the differential gear apparatus according to Embodiment 4 of the present invention. The differential gear apparatus is provided with the first shaft 51 and the second shaft 52 arranged coaxially so as to be freely rotatable; a sun gear 80 and fitted and supported to the second shaft 52 so as to be freely rotatable; an internal gear 81 which is arranged on the outer circumference of the sun gear 80 so as to be freely rotatable and to which the first shaft 51 is coupled coaxially to be rotated in conjunction with it; two planetary gears 82 meshed with the sun gear 80 and the internal gear 81; a carrier 83 which supports the planetary gears 82 and to which the second shaft 52 is coupled coaxially to be rotated in conjunction with it; and a differential electric motor 84 as the actuator that is arranged on the outer circumference of the second shaft 52. A cylindrical rotator 84*a* of the electric motor 84 is coupled to the sun gear 80 coaxially to be rotated in conjunction with it.

In Embodiment 4, the internal gear 81 is formed in a cylindrical shape with a bottom having a tooth on the inner circumference thereof and the first shaft 51 is coupled to the center portion of the bottom. The sun gear 80 is formed to be integrated with the rotator 84*a* as a movable part, a permanent magnet 84*b* is disposed on the outer circumference of the rotator 84*a*, and a stator 84*c* is disposed on the outer circumference of the permanent magnet 84*b*.

The carrier 83 is formed in a disk and the fitting holes 72 and 72 are symmetrically mounted at two deflected locations from the rotational center. In other words, two fitting holes 72 and 72 are disposed on one line perpendicular to the rotational center line, and the planetary gears 82 and 82 are supported by the fitting holes 72 and 72 so as to be freely rotatable. The fitting holes 72 and 72 are processed in the same way as the first, second, and third methods according to Embodiment 3.

Each of the planetary gears 82 has a tooth part 82*a* and a shaft part 82*b* that is protruded at one side of the tooth part 82*a*, and the shaft part 82*b* is supported in the fitting hole 72 at only one end via the needle roller bearing 65 so as to be freely rotatable.

In Embodiment 4, by rotating the first shaft 51, the rotational speed of the second shaft 52 is decreased via the internal gear 81, the planetary gears 82, and the carrier 83. In addition, when the differential electric motor 84 is driven by the instruction signal to be outputted from the controller to the drive circuit, the rotational speed of the second shaft 52 is increased via the sun gear 80, the planetary gears 82, and the carrier 83.

In the meantime, although a reaction force electric motor is not illustrated in Embodiment 4, another structure may also be employed for Embodiment 4 in which the transmission gear is provided in the middle of the first shaft 51 as in Embodiment 3, and a reaction force electric motor having a drive gear meshing with the transmission gear and applying the reaction force in the opposite direction of the torque to be applied to the first shaft 51 to the first shaft 51 is provided. The other arrangements and actions are identical to those of Embodiment 3 and will be described in no more detail while like components are denoted by like numeral.

Further, in the above-described Embodiment 3 and Embodiment 4, the electric motors 60 and 63 are used as the actuators for the differential and the reaction force, however, the actuators for the differential and the reaction force are not specified to the electric motors.

In addition, in the above-described Embodiment 3 and Embodiment 4, the differential and reaction force electric motors (actuators) 60 and 63 are provided, however, the reaction force electric motor (actuator) 63 is not always necessary.

In addition, in Embodiment 3, the differential electric motor 60 rotates the carrier 57, however, for example, the electric motor 60 may directly rotate the second shaft 52.

Further, in Embodiment 4, the internal gear 81 is coupled to the first shaft 51 to be rotated in conjunction with it, the carrier 83 is coupled to the second shaft 52 to be rotated in conjunction with it, and the differential electric motor 84 rotates the sun gear 80. However, in FIG. 9, the first shaft 51 may be provided with the sun gear 80, the carrier 83 may be coupled to the rotator 84*a* of the electric motor 84 to be rotated in conjunction with it, and the carrier 83 may be rotated by the electric motor 84. In addition, in FIG. 9, the carrier 83 may be coupled to the first shaft 51 to be rotated in conjunction with it, the internal gear 81 may be coupled to the rotator 84*a* of the electric motor 84 to be rotated in conjunction with it and the second shaft 52 may be provided with the sun gear 80. Further, in FIG. 9, the first shaft 51 may be provided with the sun gear 80, the internal gear 81 may be coupled to the rotator 84*a* of the electric motor 84 to be rotated in conjunction with it, and the second shaft 52 may be provided with the carrier 83.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A differential gear apparatus, comprising:
a first sun gear coupled to a freely rotatable first shaft to be rotated in conjunction with the first shaft;
a second sun gear coupled to a freely rotatable second shaft to be rotated in conjunction with the second shaft;
a first planetary gear meshed with the first sun gear;
a second planetary gear rotated with the first planetary gear and meshed with the second sun gear; and
a carrier supporting the first and second planetary gears, wherein
the sun gears and the planetary gears have profile shifted teeth of which addendum modifications are different at the positions in a flank width direction.

2. The differential gear apparatus according to claim 1, further comprising:
a nut screwed to the first shaft or the second shaft.

3. The differential gear apparatus according to claim 2, further comprising:
a housing for housing the nut and housing and supporting the first shaft or the second shaft to which the nut is screwed, wherein
the nut has an engagement portion at its outside, and the housing has a through hole at a position facing the engagement portion.

4. The differential gear apparatus according to claim 3, further comprising:
a first bearing supporting a first shaft or a second shaft, to which the nut is screwed;
a pressure body abutting on the first bearing and pressurizing the first bearing in a center line direction; and
a fitting ring abutting on the carrier and fitting the nut between the first bearing and itself.

5. The differential gear apparatus according to claim 2, further comprising:

a first bearing supporting a first shaft or a second shaft, to which the nut is screwed;

a pressure body abutting on the first bearing and pressurizing the first bearing in a center line direction; and a fitting ring abutting on the carrier and fitting the nut between the first bearing and itself.

6. A differential gear apparatus, comprising:

a freely rotatable sun gear;

a freely rotatable internal gear arranged on an outer circumference of the sun gear;

a planetary gear meshed with the sun gear and the internal gear;

a freely rotatable carrier supporting the planetary gear;

a first shaft coupled to any one of the sun gear, the internal gear, and the carrier to be rotated in conjunction with it;

a second shaft coupled to any other one of the sun gear, the internal gear, and the carrier to be rotated in conjunction with it; and a nut screwed into the first shaft or the second shaft, wherein the sun gear, the internal gear, and the planetary gear have profile shifted teeth of which addendum modifications are different at the positions in a flank width direction.

7. A differential gear apparatus, comprising:

a freely rotatable first and second sun gears;

a first planetary gear meshed with the first sun gear;

a second planetary gear rotated with the first planetary gear and meshed with the second sun gear; and a carrier supporting the first and second planetary gears so that the first and second planetary gears freely rotate on their axes or orbit, and having a fitting hole at its rotation center part, wherein the carrier has fitting holes at positions bisected in a circumferential direction, and the planetary gears are supported in the bisected fitting holes.

8. A differential gear apparatus, comprising:

a freely rotatable sun gear;

a freely rotatable internal gear arranged on an outer circumference of the sun gear;

a planetary gear meshed with the sun gear and the internal gear; and a carrier supporting the planetary gear so that the planetary gear freely rotates on its axis or orbits, wherein the carrier has a fitting hole at a position bisected in a circumferential direction, and the planetary gear is supported in the bisected fitting hole.

9. A method of processing a carrier of a differential gear apparatus comprising the steps of:

connecting a first gear to a first shaft;

connecting a second gear to a second shaft;

arranging the second gear on an outer circumference of the first gear;

processing a fitting hole at a position bisected in a circumferential direction, by:

moving at least one of up and down or linearly a tool among three positions on one line of the carrier;

coupling a plurality of carriers such that the bisected fitting holes are arranged concentrically;

supporting a planetary gear in the bisected fitting holes; and meshing the first gear with the planetary gear.

10. The method of claim 9, wherein the moving step comprises the step of moving up and down three aligned tools through the carrier.

* * * * *